H. B. HALE & T. FLAGLER.
MODE OF ATTACHING ANIMALS TO CARRIAGES.
No. 75,262. Patented Mar. 10, 1868.
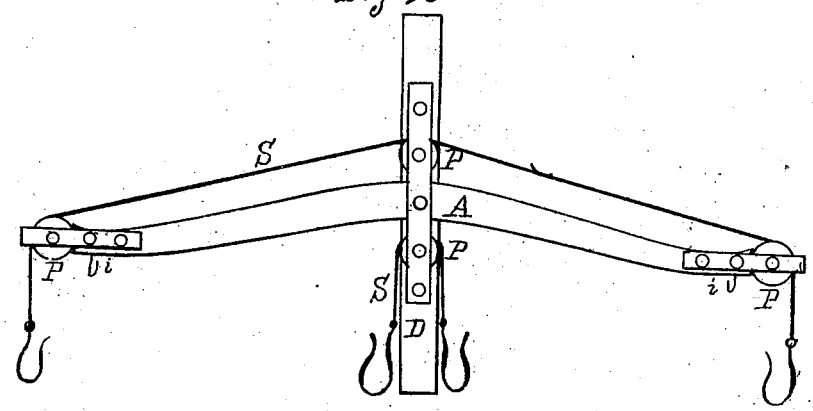
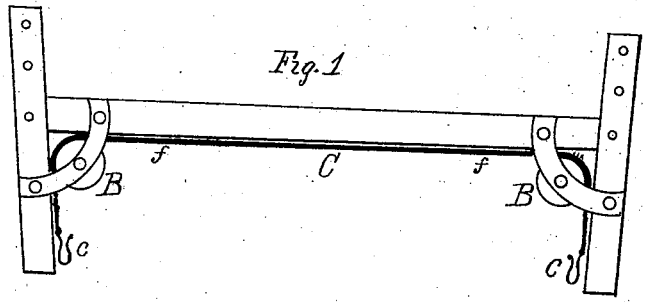
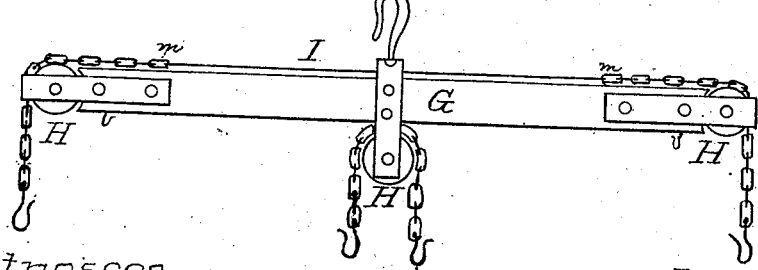

United States Patent Office.

HENRY B. HALE AND THOMAS FLAGLER, OF GRASS LAKE, MICHIGAN.

Letters Patent No. 75,262, dated March 10, 1868.

---

IMPROVEMENT IN THE MODE OF ATTACHING ANIMALS TO CARRIAGES.

---

The Schedule referred to in these Letters Patent and making part of the same.

---

Be it known that we, HENRY B. HALE and THOMAS FLAGLER, of Grass Lake, in the county of Jackson, and State of Michigan, have invented an Improved Mode of Attaching Animals to Vehicles, and for draught universally; and we do hereby declare that the following is a full, clear, and exact description of the construction and operation of the same, reference being had to the annexed drawings, making a part of this specification.

This invention consists in using two pulleys for attaching one horse to a carriage in such a manner that the reciprocating movement upon the pulleys will accommodate itself to the vibratory motion of the animal when travelling; and also, when attaching two or more animals abreast to any load or vehicle, so arranging a number of pulleys as to equalize the draught throughout.

In this arrangement one horse starting ahead of the other gains no advantage in draught, as when whiffle-trees are used.

Figure 1 is a section of shafts for one horse.

Figure 2, a section of carriage-pole, with draught-bar, &c., attached.

Figure 3 is a draught-bar for farm purposes and all kinds of heavy draught.

In fig. 1, B B are pulleys; C may be entirely of leather, or an iron rod, extending from $b$ to $b$, where leather straps may be attached to reciprocate upon the pulleys; $c\ c$, hooks or snaps to attach tugs.

In fig. 2, C C, leather straps or other suitable material; $s\ s\ s\ s$, hooks for tugs; $f\ f$, hooks which can be used when necessity requires.

In fig. 3, G is a draught-bar; H H H, pulleys; I may be entirely of leather, or entirely chain, or an iron rod, from $b$ to $b$, and short chains or straps attached to operate upon the pulleys.

In arranging our pulleys, we always place them parallel, and on a line with the draught, never putting them on the top of our draught-bar or shafts. This we consider very important.

We claim the construction of a draught or extension-bar, with or without joints, in connection with pulleys, straps, chains, and rods, arranged in the manner and for the purposes specified.

H. B. HALE,
THOMAS FLAGLER.

Witnesses:
ORRIN UPDIKE,
ROBERT DAVIS.